Nov. 20, 1928.

O. A. RUSSELL 1,692,314

SAFETY DEVICE FOR AUTOMATIC SCREW MACHINES

Filed July 30, 1926     3 Sheets-Sheet 1

Inventor.
O. A. Russell
By his Attorney

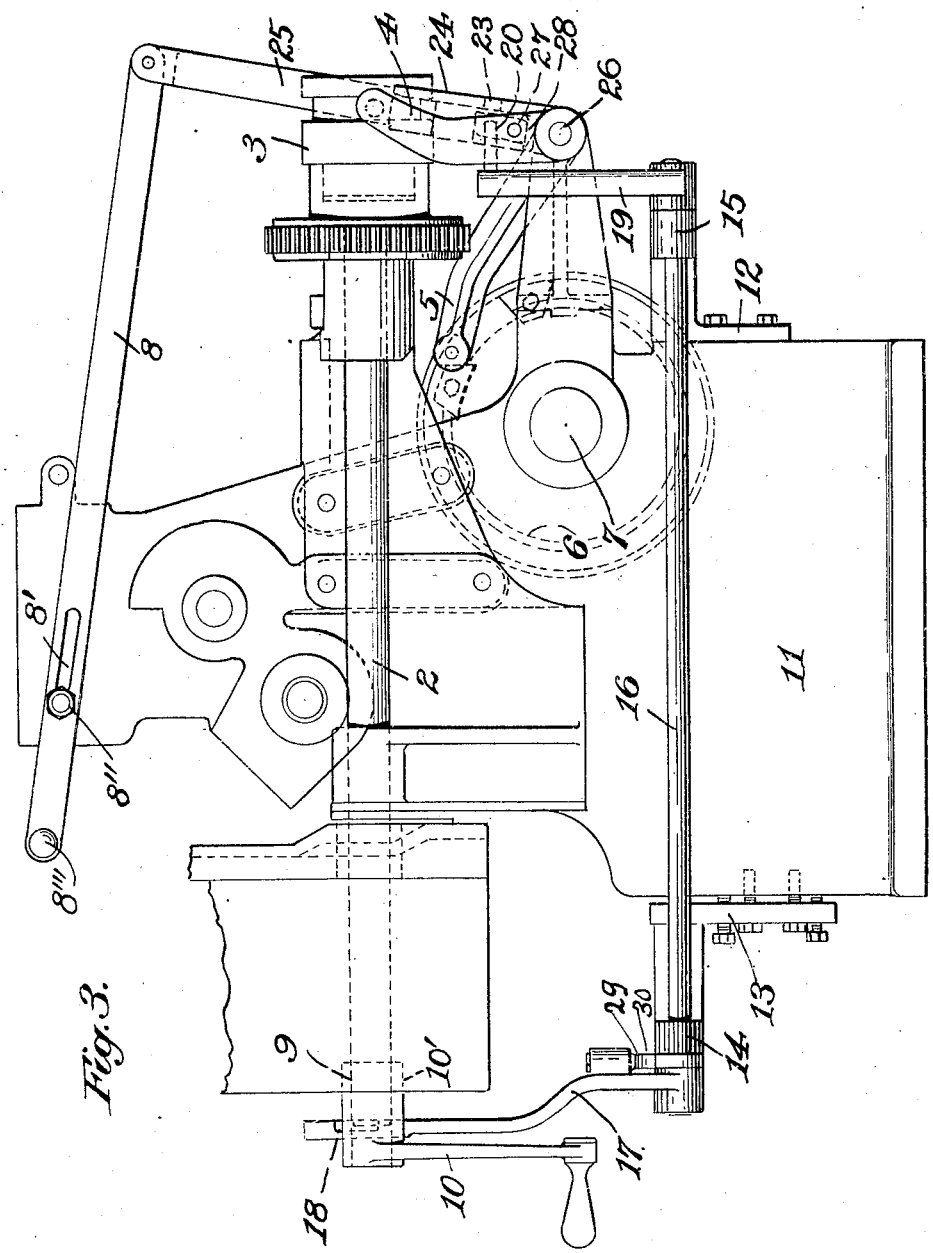

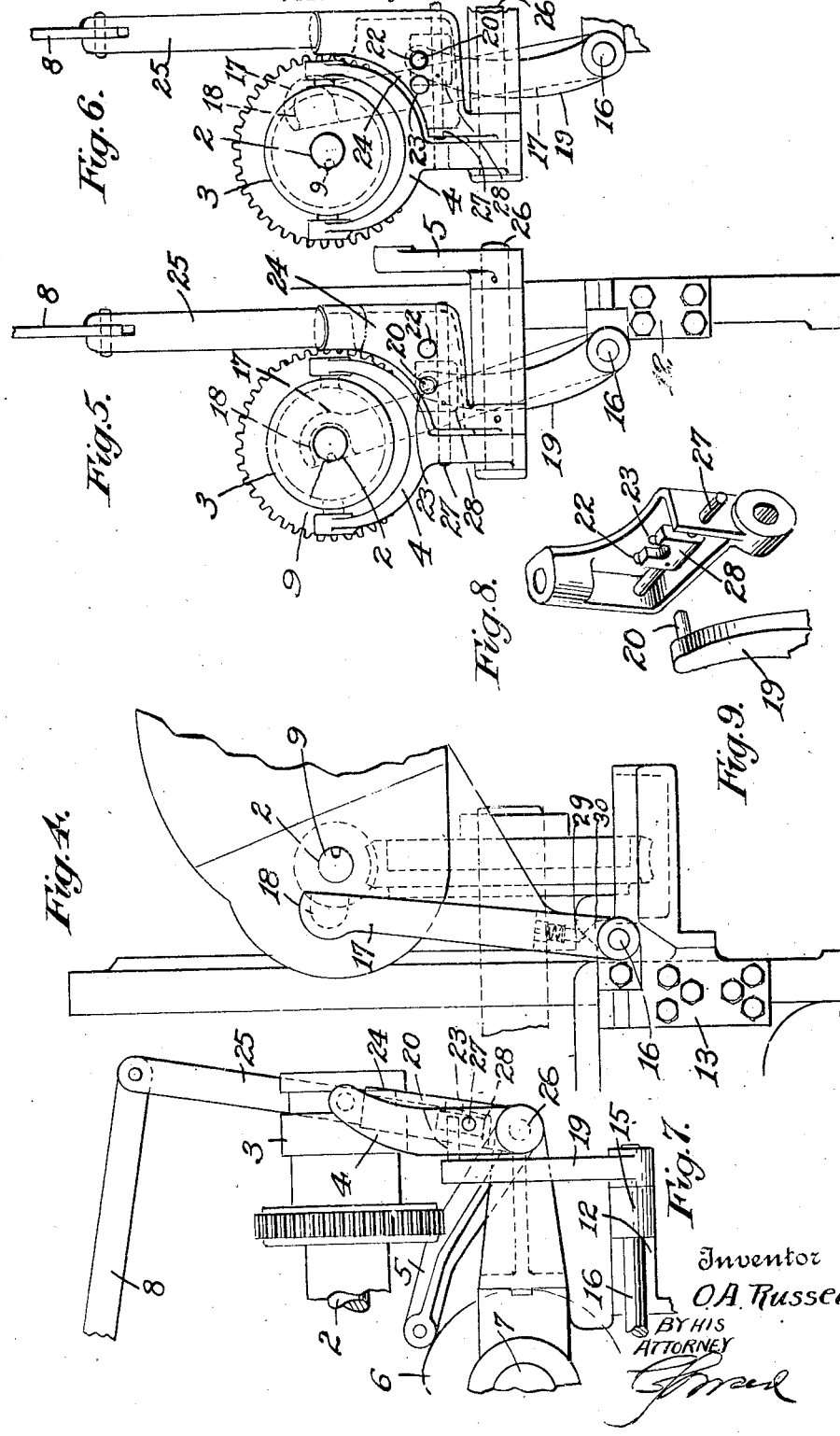

Patented Nov. 20, 1928.

1,692,314

UNITED STATES PATENT OFFICE.

OLIVER A. RUSSELL, OF WINDSOR, VERMONT, ASSIGNOR TO THE NATIONAL ACME COMPANY, OF CLEVELAND, OHIO, A CORPORATION OF OHIO.

SAFETY DEVICE FOR AUTOMATIC SCREW MACHINES.

Application filed July 30, 1926. Serial No. 125,862.

This invention has for its object the provision of safety mechanism for use with power driven and manually operated shafts, in connection with which a clutch is used for transmitting power to the shaft, and particularly to those shafts used in automatic screw machines such as the Gridley, one of the objects of the invention being to provide a safety mechanism which will prevent the attachment of a hand crank to the shaft when the clutch is engaged and which will also prevent the engagement of the clutch either by hand or power when the crank is on the shaft, and which safety mechanism is simple in construction, quickly and easily operated and positive in its action and by means of which the operation of the clutch either by hand or by power when the crank handle is on the shaft is positively prevented while placing of the crank upon the shaft when the clutch is engaged is likewise prevented.

In automatic screw machines, a power operated clutch driven shaft is used and this is rotated at high speed, the clutch of which is thrown into operative and inoperative positions automatically and the operation of this clutch is also manually controlled. Frequently it is necessary to turn over the mechanism of the machine by rotating this shaft through the medium of a crank handle placed on the end thereof and should the clutch at this time be accidently thrown into operative position, serious injury not infrequently results to the operator.

The operator at the time of placing the hand crank upon the shaft must exercise care that the clutch is not engaged since if it is the crank may be caused to slide from the shaft or be pulled from the operator's hand to the injury of the arm or person of the operator.

Therefore it is highly desirable to provide a fool-proof safety mechanism which will prevent the attachment of the crank handle to the shaft while the clutch is engaged and which will also prevent the engagement of the clutch when the crank handle is on the shaft.

Figure 1:
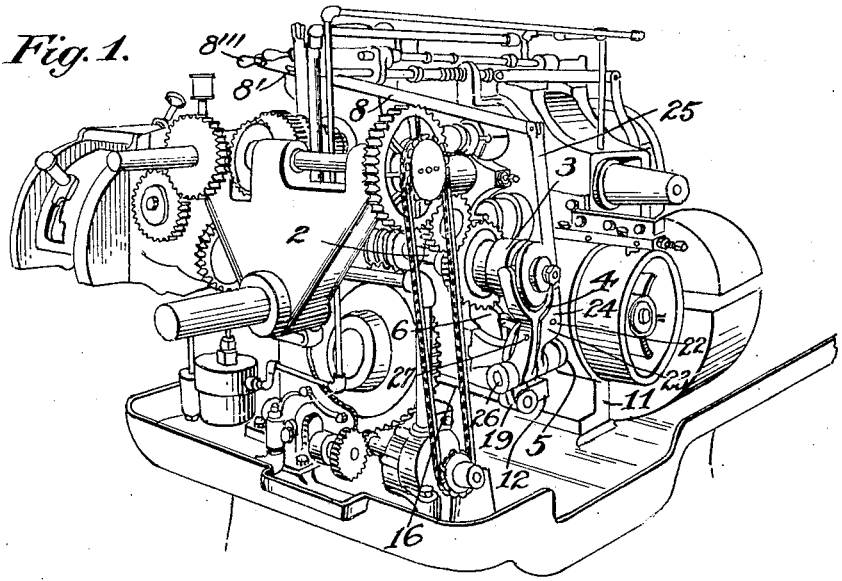
Figure 2:
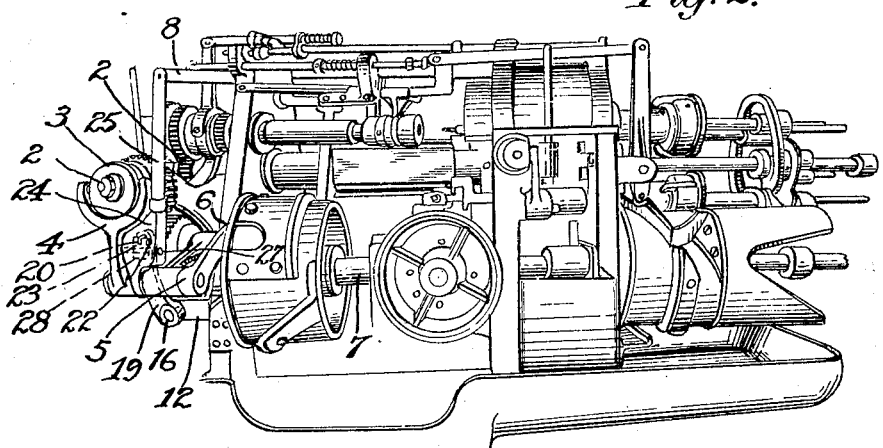

In the drawings accompanying and forming a part of this specification, Fig. 1 illustrates one end of a Gridley multiple spindle automatic screw machine having this improved safety mechanism applied thereto; Fig. 2 is a side view thereof; Fig. 3 is a view illustrating the power driven clutch shaft and its safety mechanism applied thereto, the crank handle being in position and the clutch disengaged; Fig. 4 is a left hand end view of Fig. 3; Fig. 5 is a right hand end view of Fig. 3 illustrating the safety mechanism in position to prevent the attachment of the hand crank; Fig. 6 is a similar view to that shown in Fig. 5 illustrating the safety mechanism in position to permit the attachment of the hand crank; Fig. 7 is a detail view of the right hand end of the machine as shown in Fig. 3 with the clutch engaged and Figs. 8 and 9 are detail views of a part of the safety mechanism cooperating with the clutch.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In automatic screw machines, particularly the multiple spindle variety such as the Gridley a power operated shaft is used which is driven from a cam shaft and this shaft is located transversely of the machine and is used to transmit power to certain of the mechanisms. This shaft 2, see Fig. 3, is provided at one end with a clutch 3, one member of which is fixed to the shaft while the other member is loose thereon and is connected with a suitable source of power, this clutch member being thrown into and out of engagement with the fixed clutch member thereby to rotate the shaft 2 by means of a suitable yoke 4, which is automatically controlled by a lever 5 operated by means of a cam 6 on the cam shaft 7. The yoke of this rotatable clutch member is also usually operated by a hand lever 8 likewise connected with the yoke so that at certain times the clutch may be thrown into and out of operative position by the hand lever while during the normal operation of the machine it is automatically operated from the cam shaft. The opposite end of the shaft as 9 is in position to receive a crank handle 10 which is usually used to turn over the machine at certain times particularly when tooling or repairs are necessary, it being intended that the crank handle be used only when the clutch is in its inoperative position. To prevent the attachment of this crank handle upon the shaft except when the clutch is in its inoperative position and to prevent the clutch from being accidentally thrown into position when the crank handle is on the shaft, this safety mechanism is provided, which may be readily attached to machines as now constructed without any material change in the structure or mechanism thereof and by means of which the operator is insured against injury at all times.

In the preferred form shown there is attached to the base of the machine 11 a pair of brackets 12 and 13 bolted one to each side thereof, these brackets being so made that they may be applied to machines already on the market. Carried in bearings 14 and 15 of these brackets is a rock shaft 16 having at one end a lever 17, the upper end of which is provided with a recess 18 adapted to partially encircle the shaft 2 at that end thereof to which the crank handle 10 is applied and when this lever is in engagement with the shaft 2 it will be obvious that it is impossible to attach the hub 10' of the crank handle upon the shaft but when the lever is thrown away from the shaft by hand the crank handle can be readily attached to the shaft 2.

At the opposite end of the rock shaft 16 is secured a lever 19 which is shifted back and forth by the manipulation of the lever 17. This lever 19 is provided with a pin 20 which is in position to shift a block 28 and sliding pin 27 for connecting and disconnecting the clutch yoke 4 in the manner hereinafter described. This pin 20 in different positions thereof projects into either one of two openings 22 and 23 of a swinging lever 24 see Fig. 8 to which a rod 25 is secured and to this rod the handle bar 8 is pivoted, this handle bar being guided by a slot and bolt 8' 8'' and having a handle 8''' by means of which the rod 25 and the lever 24 may be swung back and forth by hand. This lever 24 is mounted on and fixed to a stud 26 located adjacent to and under the clutch end of the shaft 2. This stud 26 also carries the clutch operating yoke 4 which however is free to swing on this stud being loosely mounted thereon. The stud also carries the cam operated lever 5 which is fixed to the stud so that the shifting thereof will shift the lever 24. Mounted in this lever 24 is the sliding pin 27 carrying the slotted or crotched block 28 movable therewith. One end of this pin is in position to pass through the yoke 4 so that when the pin 27 is in engagement with the yoke, the yoke will be connected, although normally free, with the lever 24 and therefore shiftable therewith to swing with the stud 26 when the same is shifted either by the cam lever 5 or by the hand operated bar 8, since the cam operated lever 5 and the lever 24 are both fixed to the stud. The lever 17 is so positioned on the shaft 16 relatively to the lever 19 that when the lever 17 is thrown across the end of the shaft 2 to prevent the attachment of the crank handle thereto, the lever 19 through the medium of its pin 20 will shift the sliding block 28 and thereby the sliding pin 27 into position to engage the clutch yoke so that the yoke will be connected with the lever 24 and consequently when this lever is shifted either by the hand bar 8 or the cam operated lever 5, the clutch will be thrown into operative position, whereupon the pin 20 of the lever 19 will project into the opening 23 of the lever 24 and lock the parts in this operative position, at which time of course the crank handle 10 cannot be attached to the shaft 2.

When however it is desired to attach the crank handle to the shaft 2, the lever 17 is shifted away from the shaft 2 and thus thru the medium of the lever 19 and its pin 20 the block 28 and thereby the sliding pin 27 is shifted out of engagement with the clutch yoke, thereby making it impossible for the cam lever 5 to impart any movement to the clutch member, assuming of course that the clutch has been previously disconnected by the hand bar 8.

Thus, when the operator throws the lever 17 away from the crank end of the shaft 2 in order to attach the crank 10, the sliding pin 27 is withdrawn from the clutch operating yoke 4 by means of the pin 20 carried by the lever or arm 19 cooperating with the block 28; so that the clutch cannot be subsequently thrown into operative position either by power or by hand while the crank handle is on the end of the shaft 2.

In the position of the parts shown in Fig. 3 in which the crank handle 10 is on the end of the shaft 2 and the clutch is in its inoperative position, Figs. 3 and 6, should the lever 24 fixed to the stud 26 be shifted through the medium of the hand operated bar 8 or the lever 5 for the purpose of connecting the clutch, the opening 22 thereof will receive the pin 20 of the lever 19, see Fig. 8, and thus lock the pin 27 in its disconnecting position with the yoke 4, and since this pin 27 constitutes the positive connection between the yoke which loosely swings on the stud 26 and the lever 24 which is fixed to that stud, it follows that the yoke is not moved and therefore the clutch is not thrown into operative position.

When however, the crank handle has been removed from the shaft 2 to prevent the re-attachment thereof the lever 17 of the shaft 16 is swung into engagement with the shaft 2, and this shifts the lever 19 and its pin 20 thereby shifting the block 28 and sliding pin 27 into engagement with the yoke 4, so that the clutch can then be thrown into operative position either by means of the hand bar 8 or the cam operated arm 5. At this time the pin 20 of the arm 19 will project into the opening 23 and thus lock the block 28 and its sliding pin 27 in the clutch operating position.

Thus, it will be seen that when the crank handle is removed and the lever 17 is shifted toward the shaft 2 and covers this shaft, see Fig. 5, the sliding pin 27 is carried into the yoke 4 by means of the lever 19 and its pin 20 and so locks the yoke 4 to the stud 26, at which time the pin 20 of the lever 19 is in position to project into the opening 23 of the lever 24 when the clutch is thrown into operative position by the hand bar 8 or the cam operated lever 5 thereby locking the yoke thru the medium of the stud 26 with the lever 24 and at this time the hub of the handle 10 cannot be attached to the shaft 2. When however it is desired to attach the handle 10 to the shaft 2, the lever 17 is thrown away from the shaft 2, see Fig. 6 whereupon the arm 19 is simultaneously shifted and thru the medium of the pin 20 shifts the block 28 and thereby the sliding pin 27 out of engagement with the clutch shifter 4, thereby disconnecting it from the stud 26 and the lever 24, so that the further operation of the clutch by the hand bar 8 or cam lever 5 is prevented, the parts being locked in this position by the projection of the pin 20 at this time into the hole 22 of lever 24 when the lever 24 is thrown toward the lever 19 by the attempted operation of the clutch either thru the cam lever 5 or the hand bar 8, thus preventing any possible injury to the operator while the crank handle is upon the shaft.

When the crank handle is removed and the lever 17 thrown into engagement with the shaft 2 thereby sliding the pin 27 into engagement with the yoke 4, the shifting of the clutch members into engagement throws the lever 24 into position so that the pin 20 will project into the opening 23 thereby locking the sliding pin 27 and yoke together and this also locks the lever 17 into position over the shaft 2 and prevents the attachment of the crank handle to the shaft 2 while the clutch members are in operative position, so that this safety mechanism not only locks the clutch yoke in operative position but also locks the lever 17 over the shaft 2 as well as locking the clutch in its inoperative position, so that when the lever 17 is locked over the shaft 2 the shifting of this lever is prevented to attach the crank handle during the time the clutch is in engagement.

Thus, it will be observed that in this safety mechanism the connecting means between the yoke and the lever 24 by means of which the yoke is operated and which connecting means consists of the sliding pin 27 and its block 28, is locked in either its yoke-locking or yoke unlocking position and when in its yoke-locking position the crank handle 10 cannot be attached to the shaft 2 since the lever arm 17 is also locked over the shaft 2. When however the crank handle has been removed from the shaft 2, should the operator move the hand lever 8 in an attempt to throw the clutch members into engagement this will not be effective since the only result will be to swing the lever 24 and the stud 26 without swinging the yoke 4 which is loosely mounted on that stud. Therefore in order to shift the yoke 4 it is necessary to connect this yoke with the lever 24 by means of the sliding pin 27 and to do this it is necessary for the operator to throw the lever 17 into engagement with the shaft 2 which of course requires the removal of the crank and thereby prevents the re-attachment thereof, and thus shifting the pin 27 by means of the arm 19 and pin 20 into engagement with the clutch yoke.

For the purpose of holding the rock shaft 16 and its levers or lever arms 17 and 19 in either forward or rearward position, a spring detent is provided, see Figs. 3 and 4. This comprises a spring pressed plunger 29 having offset flat faces to coact with a similarly formed two-faced member 30 carried by the bracket 13. In one position this plunger holds the lever 17 away from the shaft 2 and in another position holds the lever 17 in engagement with the shaft 2, having a corresponding action upon the lever 19.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same; although without attempting to set forth all of the forms in which it may be made, or all of the modes of its use, I claim:

1. In a machine having a manually operative and power driven shaft and clutch, mechanism for transmitting power to the shaft, positively acting means shiftable into position to cooperate with said shaft for preventing the attachment of manually operating means to the shaft when the clutch is engaged and having connection with the clutch mechanism for preventing the operation thereof when the manual means is attached, and independent means for operating said clutch mechanism.

2. In a machine having a manually operative and power driven shaft, a clutch for transmitting power to the shaft and clutch shifting means, positively acting means shiftable into position to cooperate with said shaft for preventing the attachment of manually operating means to the shaft when the clutch is engaged and having connection with the clutch shifting means for preventing the operation of the clutch when the manual means is attached.

3. In a machine having a manually operative and power driven shaft, a clutch for transmitting power to the shaft and clutch shifting means, positively acting means shiftable directly to engage the power driven shaft for preventing the attachment of manually operating means to the shaft when the clutch is engaged and having connection with the clutch shifting means for preventing the operation of the clutch when the manual means is attached, and independent means for operating said clutch shifting means.

4. In a machine having a manually operative and power driven shaft, a clutch for transmitting power to the shaft and clutch shifting means, positively acting means shiftable into position to cooperate with said shaft for preventing the attachment of manually operating means to the shaft when the clutch is engaged and having connection with the clutch shifting means thereby to permit the clutch to be operated, independent means for operating said clutch shifting means, and means for locking said preventing means in position.

5. In a machine having a manually operative and power driven shaft, a clutch for transmitting power to the shaft and clutch shifting means, positively acting means shiftable into position to cooperate with said shaft having connection with the clutch shifting means for preventing the engagement of the clutch when manually operating means is attached to the shaft and for preventing the attachment of the manually operating means to the shaft when the clutch is engaged, and independent means for operating said clutch shifting means.

6. In a machine having a manually operative and power driven shaft, a clutch for transmitting power to the shaft and clutch shifting means, means having connection with the clutch shifting means for preventing the engagement of the clutch when manually operating means is attached to the shaft and for preventing the attachment of the manually operating means to the shaft when the clutch is engaged, independent means for operating said clutch shifting means, and means for locking the clutch in its inoperative position.

7. In a machine having a manually operative and power driven shaft, a clutch for transmitting power to the shaft and clutch shifting means, means having connection with the clutch shifting means for preventing the engagement of the clutch when manually operating means is attached to the shaft and for preventing the attachment of the manually operating means to the shaft when the clutch is engaged, independent means for operating said clutch shifting means, and means for locking the preventing means in position.

8. In a machine having a manually operative and power driven shaft, a clutch for transmitting power to the shaft, and clutch shifting means, means having connection with the clutch shifting means for preventing the engagement of the clutch when manually operating means is attached to the shaft and for preventing the attachment of the manually operating means to the shaft when the clutch is engaged, independent means for operating said clutch shifting means, means for locking the preventing means in position, and means for locking the clutch in its inoperative position when the manually operative means is attached to the shaft.

9. In a machine having a manually operative and power driven shaft, a clutch for transmitting power to the shaft and clutch shifting means, means for preventing the engagement of the clutch when manually operating means is attached to the shaft and comprising means shiftable to cooperate with the power shaft and having connection with the clutch mechanism, and independent means for operating said clutch shifting means.

10. In a machine having a manually operative and power driven shaft, a clutch for transmitting power to the shaft and clutch shifting means, means for preventing the engagement of the clutch when manually operating means is attached to the shaft and comprising means shiftable to cooperate with the power shaft and having connection with the clutch mechanism, independent means for operating said clutch shifting means, and means for locking the clutch in its inoperative position.

11. In a machine having a manually and power driven shaft and a clutch for transmitting power to the shaft, the combination of a clutch operating yoke, a stud loosely mounted in said yoke, a lever fixed to said stud, means for operating said lever, means for positively connecting said lever with the yoke, and means for shifting said positive connecting means and including a member effective to engage the shaft and prevent the attachment of the manually operated means thereto.

12. In a machine having a manually and power driven shaft and a clutch for transmitting power to the shaft, the combination of a clutch operating yoke, a stud loosely mounted in said yoke, a lever fixed to said stud, means for operating said lever, means for positively connecting said lever with the yoke, means for shifting said positive connecting means and including a member effective to engage the shaft and prevent the attachment of the manually operated means thereto, and means for locking the yoke connecting means in its yoke engaging and disengaging positions.

13. In a machine having a hand and power driven shaft and a clutch for transmitting power to the shaft, the combination of a yoke cooperating with the clutch, a stud loosely mounted in the yoke, a lever fixed to said stud, manual and automatic means for shifting the lever, a sliding pin carried by said lever and effective to connect and disconnect the yoke with said lever, a rock shaft, a lever carried at one end thereof and having means for shifting said sliding pin, a lever connected to the other end of said shaft and operative to engage the power driven shaft to prevent the attachment of a handle thereto, and means carried by a pair of said levers for locking the connecting pin in different positions.

14. In a machine having a hand and power driven shaft, and a clutch for transmitting power to the shaft, the combination of a yoke cooperating with the clutch, a stud loosely mounted in the yoke, a lever fixed to said stud, manual and automatic means for shifting the lever, a sliding pin carried by said lever and effective to connect and disconnect the yoke with said lever, a rock shaft, a lever carried at one end thereof and having means for shifting said sliding pin, a lever connected to the other end of said shaft and operative to engage the power driven shaft to prevent the attachment of a handle thereto, and means carried by a pair of said levers for locking the connecting pin in different positions, and comprising a pin carried by one lever, a pair of openings carried by the other, and a block carried by said sliding pin.

15. In a machine having a manually and power driven shaft and a clutch for transmitting power to the shaft, the combination of a rock shaft, a lever connected therewith and shiftable in position to engage said power shaft thereby to prevent the attachment of a handle thereto, a lever also connected to said rock shaft, a lever, a sliding pin carried by said last lever, a block fixed to said sliding pin, a yoke connected with the clutch and adapted to receive said sliding pin for connecting the yoke with the sliding pin lever, and means carried by one lever and a pair of openings carried by the other and cooperating to lock the sliding pin in either of its shifted positions.

16. A safety mechanism for a manually operated and power driven shaft having a clutch for transmitting power to the shaft and a yoke for operating said clutch, comprising a rock shaft, a pair of levers carried thereby one shiftable into position to engage the power shaft and prevent the attachment of a handle thereto, a manually and automatically operative lever, means for connecting said lever with the yoke, and means carried by the other rock shaft lever for shifting said connecting means.

17. A safety mechanism for a manually operated and power driven shaft having a clutch for transmitting power to the shaft and a yoke for operating said clutch, comprising a rock shaft, a pair of levers carried thereby one shiftable into position to engage the power shaft and prevent the attachment of a handle thereto, a manually and automatically operative lever, means for connecting said lever with the yoke, means carried by the other rock shaft lever for shifting said connecting means, and means for locking said connecting means in either of its shifted positions.

18. A safety mechanism for a manually operated and power driven shaft having a clutch for transmitting power to the shaft and a yoke for operating said clutch comprising a rock shaft, a pair of levers carried thereby, one shiftable into position to engage the power shaft and prevent the attachment of a handle thereto, a manually and automatically operative lever, means for connecting said lever with the yoke, means carried by the other rock shaft lever for shifting said connecting means, and means for locking said connecting means in either of its shifted positions, and comprising a pin, a block, and a pair of openings.

19. In a machine having a manually and power driven shaft and a clutch and its shifting means for transmitting power to the shaft, the combination of means for preventing the attachment of the manually operated means to the shaft when the clutch is in its operative position, means for preventing the operation of the clutch when the manually operated means is attached to the shaft, means for locking the first preventing means in position, means for locking the second preventing means, and means for connecting the shifting means to the preventing means.

20. In a machine having a hand and power driven shaft, a clutch and its shifting means for transmitting power to the shaft, the combination of a rock shaft, a lever carried thereby and having means for covering one part of the power shaft to prevent the attachment of a crank handle thereto, a lever also carried by said rock shaft, a lever swinging transversely of said last lever, a sliding pin carried by said swinging lever for connecting the clutch shifting means therewith, means carried by said swinging lever and by said second lever for sliding the pin and for also locking it in different positions on the swinging of said swinging lever.

21. In a machine having a hand and power driven shaft, a clutch and its shifting means for transmitting power to the shaft, the combination of a rock shaft, a lever carried thereby and having means for covering one part of the power shaft to prevent the attachment of a crank handle thereto, a lever also carried by said rock shaft, a lever swinging transversely of said last lever, a sliding pin carried by said swinging lever for connecting the clutch shifting means therewith, means carried by said swinging lever and by said second lever for sliding the pin and for also locking it in different positions on the swinging of said swinging lever, and comprising a recessed block carried by said sliding pin, a pair of openings carried by the swinging lever and a pin carried by the second lever for engaging said block and also projecting into said openings on the swinging of said swinging lever.

Signed at Windsor, Vermont, this 23rd day of July, 1926.

OLIVER A. RUSSELL.